(12) United States Patent
Bagawade et al.

(10) Patent No.: US 10,951,039 B2
(45) Date of Patent: Mar. 16, 2021

(54) MULTI-INPUT PV INVERTER SYSTEM AND METHOD

(71) Applicant: SPARQ SYSTEMS INC., Kingston (CA)

(72) Inventors: Snehal Bagawade, Kingston (CA); Ryan Fernandes, Kingston (CA); Majid Pahlevaninezhad, Kingston (CA); Praveen Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 30 days.

(21) Appl. No.: 16/391,730

(22) Filed: Apr. 23, 2019

(65) Prior Publication Data

US 2020/0343728 A1    Oct. 29, 2020

(51) Int. Cl.
*H02J 3/38* (2006.01)
*H02J 3/32* (2006.01)

(52) U.S. Cl.
CPC ............ *H02J 3/383* (2013.01); *H02J 3/32* (2013.01); *H02J 3/386* (2013.01)

(58) Field of Classification Search
CPC .... H02J 3/383; H02J 3/32; H02J 3/386; H02J 3/38
See application file for complete search history.

(56) References Cited

U.S. PATENT DOCUMENTS

2011/0115295 A1* 5/2011 Moon .................... H02J 3/382
307/65

* cited by examiner

*Primary Examiner* — Robert L Deberadinis
(74) *Attorney, Agent, or Firm* — Brion Raffoul

(57) ABSTRACT

Systems and methods relating to power inverters for power generation systems. A power inverter suitable for renewable power sources is configured with a data processing module that receives power related data from a power grid and from a battery backup inverter. The data processing module calculates mode of operation data based on the power related data and, if the mode of operation data exceeds a threshold, then the power generation system is operating in an off-grid mode (i.e. the system is decoupled from the power grid). If the mode of operation data is equal or less than the threshold, then the power generation system is operating in an on-grid operating mode. The system is also self-tuning with respect to the threshold value.

15 Claims, 10 Drawing Sheets

MULTI-INPUT PV INVERTER SYSTEM AND METHOD

TECHNICAL FIELD

The present invention relates to power generation. More specifically, the present invention relates to systems and methods for use with power generation systems using renewable energy sources.

BACKGROUND

The recent interest in environmentally friendly technology has led to a boom in not just interest in but also in the deployment of systems for use with renewable energy resources. An increasing number of houses worldwide are now being equipped with solar panels (also referred to as photovoltaic or PV panels) to partially supply power to household energy needs. These PV panels can also be used to feed power to the existing power infrastructure (i.e. the power grid).

One potential issue with current systems is that quite a few of these systems are ill equipped to operate in both on-grid (connected to the power grid) and off-grid (disconnected from the power grid) modes. A number of these systems are only suitable for grid-tied applications. In grid-tied applications, the inverter system coupled to the PV panels must stop from generating the power as soon as there is an AC power failure or an outage. This is required for the safety of the personnel who may be working on the power grid to repair the fault.

In distributed PV electricity generation, the inverters are typically colocated with or are at least close to local loads. The safety of the personnel working on the power grid can be ensured by disconnecting the local loads from the power grid using a circuit breaker. The inverters can now be operated and used in supplying power to the local loads. This mode of operation is called 'off-grid'.

To improve the usability of PV installations, the PV microinverters coupled to the PV panels should be able to operate in both the grid-connected mode (on-grid) or in a stand-alone mode (off-grid). The off-grid mode requires the PV microinverter to operate with a variety of power generators those are fed from battery, wind turbine, and other types of renewable power sources.

There is therefore a need for systems and methods that allow PV inverters to operate in both on-grid and off-grid modes. Preferably, such systems and methods are able to automatically switch from one mode to another.

SUMMARY

The present invention provides systems and methods relating to power inverters for power generation systems. A power inverter suitable for renewable power sources is configured with a data processing module that receives power related data from a power grid and from a battery backup inverter. The data processing module calculates mode of operation data based on the power related data and, if the mode of operation data exceeds a threshold, then the power generation system is operating in an off-grid mode (i.e. the system is decoupled from the power grid). If the mode of operation data is equal or less than the threshold, then the power generation system is operating in an on-grid operating mode. The system is also self-tuning with respect to the threshold value.

In a first aspect, the present invention provides a system for managing an operation of a power inverter for use with a power generation subsystem, the system comprising:
  a data sensing module for receiving power related data from circuitry monitored by said system;
  a data processing module for calculating mode of operation data based on said power related data received by said data sensing module, said mode of operation data being used to determine a mode of operation for said power inverter;
  a controller module for controlling said power inverter based on said mode of operation determined by said data processing module;
  wherein
  said power generation subsystem is switchable to provide power to at least one of: a power grid and at least one load;
  said system determines if power generated by said power generation subsystem is for provision to said power grid or to said at least one load;
  said data sensing module receives power related data from at least one battery inverter, said battery inverter being coupled to a battery with said battery being switchable to provide power to said at least one load;
  said system operates said power generation subsystem differently when said power generation subsystem is coupled to said power grid than when said power generation subsystem is not coupled to said power grid;
  said mode of operation data is based on an amount of voltage sensed at a point of common coupling between said power grid, said battery inverter, and said power inverter.

In a second aspect, the present invention provides a method for determining a mode of operation of a power generation system that is coupled to a power grid, the method comprising:
  a) determining a voltage at a point of common coupling, said point of common coupling being a coupling point to which said power grid and said power generation system and at least one load is coupled;
  b) determining a rise in said voltage determined in step a);
  c) determining a rise in current output from an inverter of said power generation system;
  d) determining if a specific condition is true, said specific condition being $$\frac{\left(\sum_{i=1}^{n} V_T\right) - n \cdot V_{T0}}{R_g} > \sum_{i=1}^{n} I_{PV}$$

e) determining that said power generation system is operating in an on-grid operating mode if said specific condition is false;
  f) determining that said power generation is operating in an off-grid operating mode if said specific condition is true;
  wherein
  $R_g$ is a typical resistance between the grid and said inverter;
  $V_{T0}$ is a terminal voltage when said inverter is not turned on;
  $V_T$ is a voltage measured at said terminals of the battery inverter;
  $I_{PV}$ is a current supplied by said inverter to said load; and wherein steps a)-c) are repeated for multiple readings of said currents and voltages.

In a third aspect, the present invention provides a system for managing an operation of a power inverter for use with a power generation subsystem, the system comprising:
- a data sensing module for receiving power related data from circuitry monitored by said system;
- a data processing module for calculating mode of operation data based on said power related data received by said data sensing module, said mode of operation data being used to determine a mode of operation for said power inverter;
- a controller module for controlling said power inverter based on said mode of operation determined by said data processing module;
- wherein
- said mode of operation data is based on an amount of voltage sensed at a point of common coupling between said power grid, said battery inverter, and said power inverter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
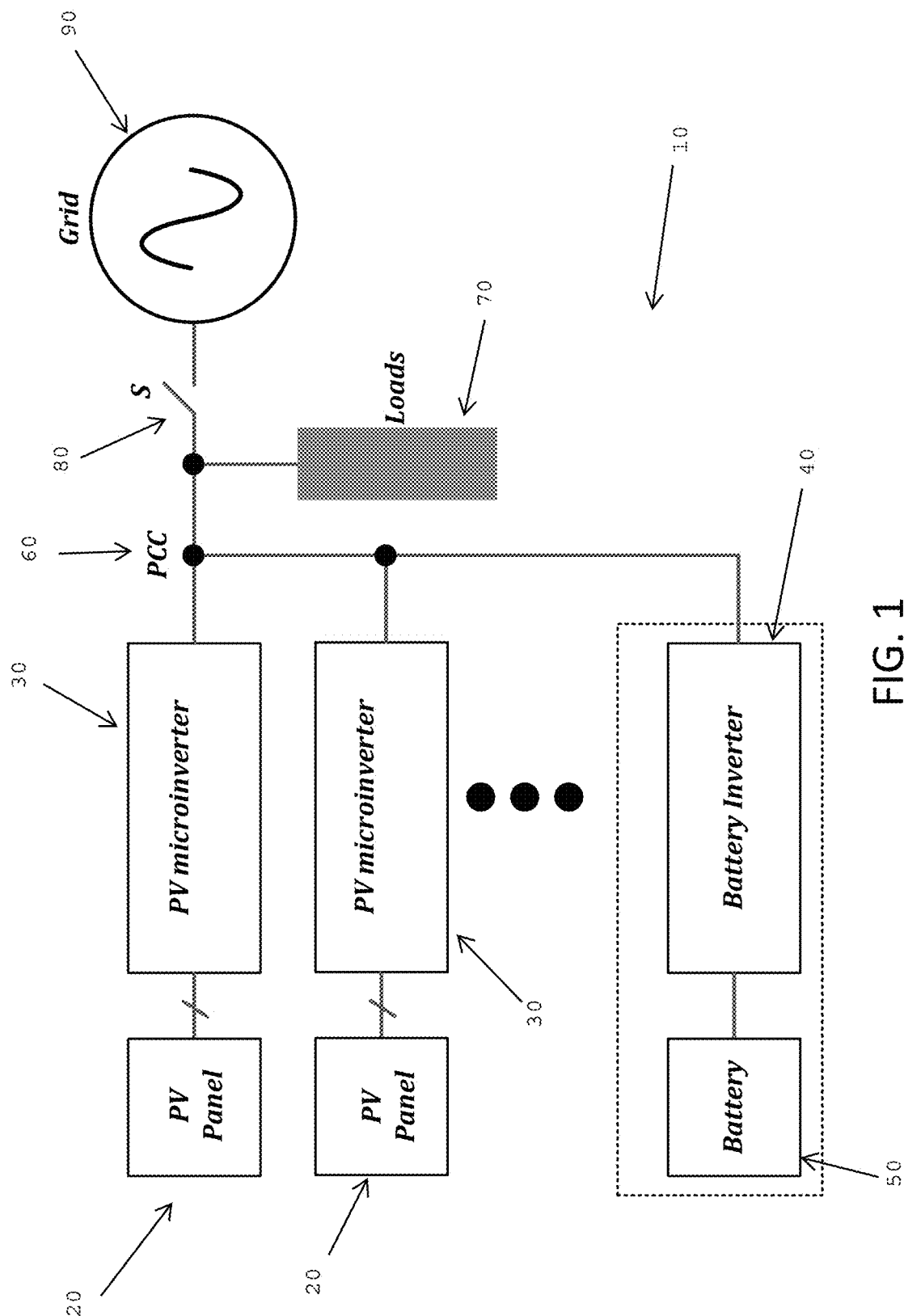
FIG. 1 is a block diagram of a power generation system coupled to sources of renewable energy and to a power grid.

Referring to FIG. 1, a block diagram of a power generation system using renewable energy sources is illustrated. In one implementation, the system 10 includes PV panels 20 coupled to PV micro inverters 30. These micro inverters are coupled to a battery inverter 40 and the battery inverter 40 is coupled, in turn, to a battery bank 50. The inverter 40 and the micro inverters 30 are all coupled to a point of common coupling (PCC) 60. Similarly coupled to PCC 60 is at least one load 70 and to one end of a switch 80. The other end of switch 80 is coupled to a power grid 90. The switch 80 controls power flow between the power produced by the PV panels and the grid 90.

In operation, the system in FIG. 1 operates depending on whether the switch S is open or closed. When AC grid power is present, the switch S is closed and the grid AC voltage is applied at PCC. The PV microinverter senses this voltage and feeds the maximum possible power that can be extracted from the PV panels to the AC grid. Grid supplies the power as demanded by the load. In this scenario, the system is operating in an on-grid mode.

When the AC power from the grid is interrupted, switch S turns off. The PV microinverter shuts-off, as the microinverter does not detect any voltage at its AC terminals. At this point, the battery inverter is turned on and establishes an AC voltage at PCC, with the magnitude of the AC voltage at PCC being variable as a function of the load. When this occurs, the PV microinverter detects the presence of AC voltage at its terminals (from the battery) and starts to operate. The PV microinverter then feeds as much power as available from the PV panels to the load, thereby changing the voltage at PCC. The control circuit for the power generation system monitors the AC voltage at PCC and determines the rate of change of this PCC voltage. This change is compared against the change in current fed by the microinverter. If the change in voltage of the PCC is greater than a typical change in voltage of the grid, then the control circuit for the power generation system determines that the power generation system is in off-grid mode. This is because, in the on-grid mode, any power fed into the power grid would not cause a significant change in the voltage since the grid voltage is tightly regulated.

Figure 2:
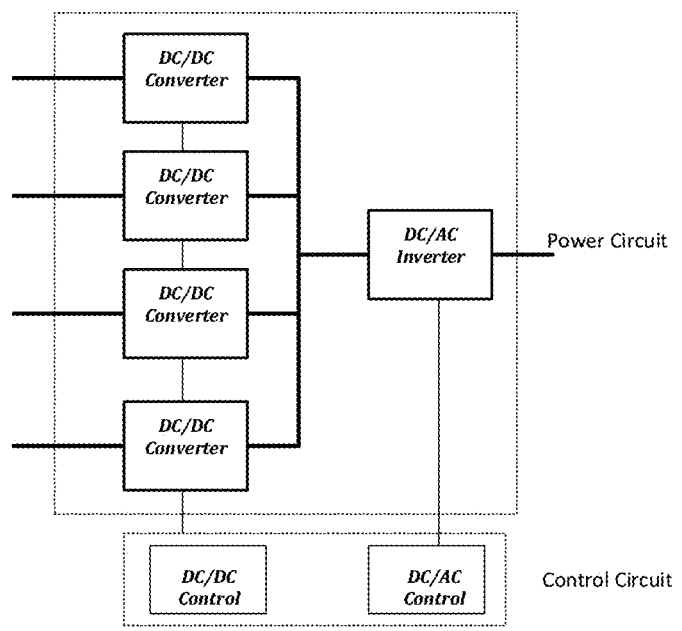
FIG. 2 is a block diagram detailing the components in a PV microinverter.

Referring to FIG. 2, a more detailed figure of the configuration where four PV panels are used. In this configuration, each PV panel is coupled to a DC/DC converter and each DC/DC converter is, in turn, coupled to a DC/AC inverter. The DC/DC converters are controlled by a DC/DC controller while the functions of the DC/AC inverter are controlled by a DC/AC controller. In this particular configuration, the 4 PV panels are connected to the PV microinverter. The PV microinverter includes a power circuit as well as a control system. The control system is responsible for controlling the power circuit during different modes of operation. For clarity, the PV micro inverter includes four DC/DC converters that are connected to the PV panels. These converters extract power from the PV panels and the outputs of these converters are connected to a DC/AC inverter. The DC/AC inverter converts DC power to AC power compatible with the load/grid requirements.

Figure 3:
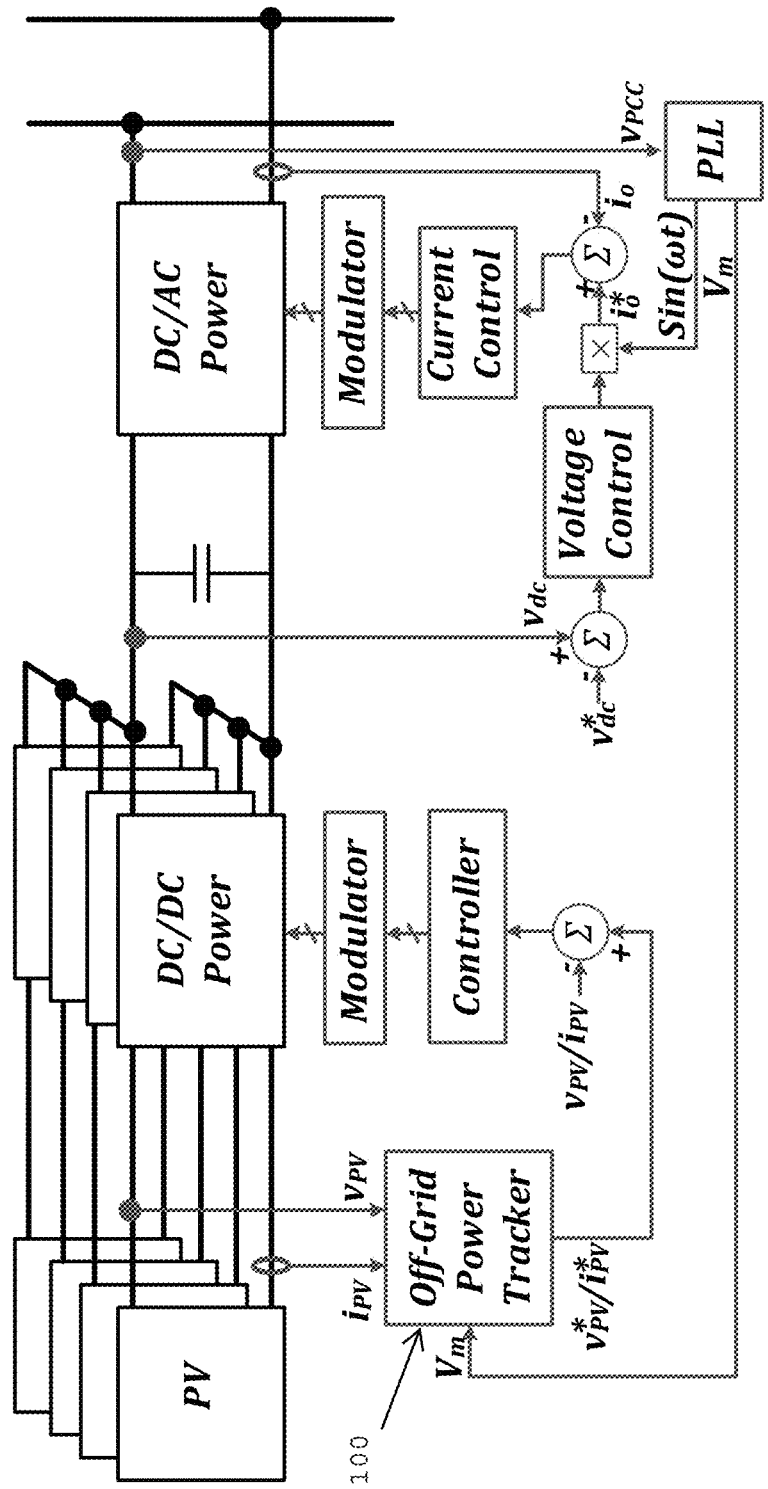
FIG. 3 is a detailed block diagram illustrating the components in the control circuitry for the PV microinverter.

Referring to FIG. 3, illustrated is a block diagram of a PV microinverter with its control system when the microinverter is operated in an off-grid mode (i.e. the microinverter is disconnected from the power grid). As can be seen from the figure, there is an off-grid power tracker block 100 embedded in the control system for the DC/DC converters. This block 100 adjusts the output power of the microinverter 30 based on load power demand up to the maximum available power from the PV panel. The amount of the extracted power from the PV panels is a function of the amplitude of the load voltage.

Figure 4:
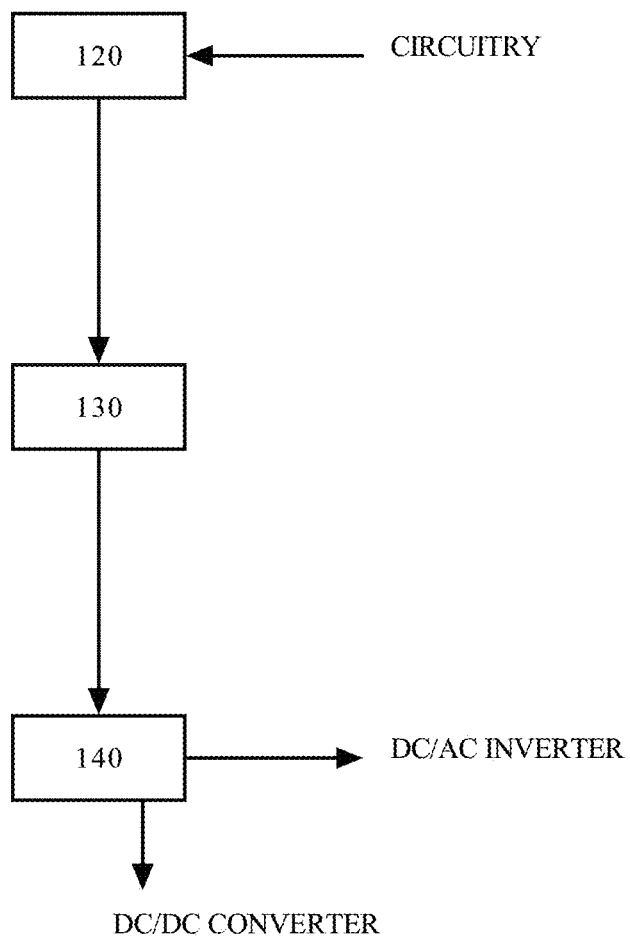
FIG. 4 is a schematic block diagram of the modules used in implementing one aspect of the present invention.

Referring to FIG. 4, a schematic block diagram of a system according to one aspect of the present invention is presented. In this system 110, a sensing module 120 receives power related data from various portions of the system illustrated in FIG. 1. The sensing module can receive voltage readings, current readings, from, for example, the PCC, the battery inverter, and the terminals of the PV microinverters. Of course, since the amounts being measured are analog values, the sensors receiving these readings will have their data converted by an A/D converter to ensure that the sensed values are properly digitized and therefore usable by a suitable data processing device. Once the sensing module 120 has received the digitized data, this data is then sent to a suitable data processing module 130 that processes the data received. The data is then used by the data processing module 120 to calculate mode of operation data. This mode of operation data calculated by the data processing module is determinative of the mode of operation of the power generation system. Once the mode of operation has been determined, suitable control commands are then sent from the data processing module 120 to a controller module 140 that controls the functions of the various components of the power generation system. As an example, the control commands may be sent to the DC/AC inverter, the DC/DC converter, and the battery inverter. Alternatively, the control commands can be sent to the DC/DC control module or to the DC/AC control module as depicted in FIG. 2. These control commands can then be used to properly operate the different components of the power generation system.

As will be explained below, the power related data is used to determine mode of operation data that determines the mode of operation of the power generation system. The power generation system can be operated as either on grid (coupled to the power grid) or as off-grid (disconnected from the power grid). The system 110 continuously samples the incoming power related data to adjust the operation of the various components as needed.

Figure 5:
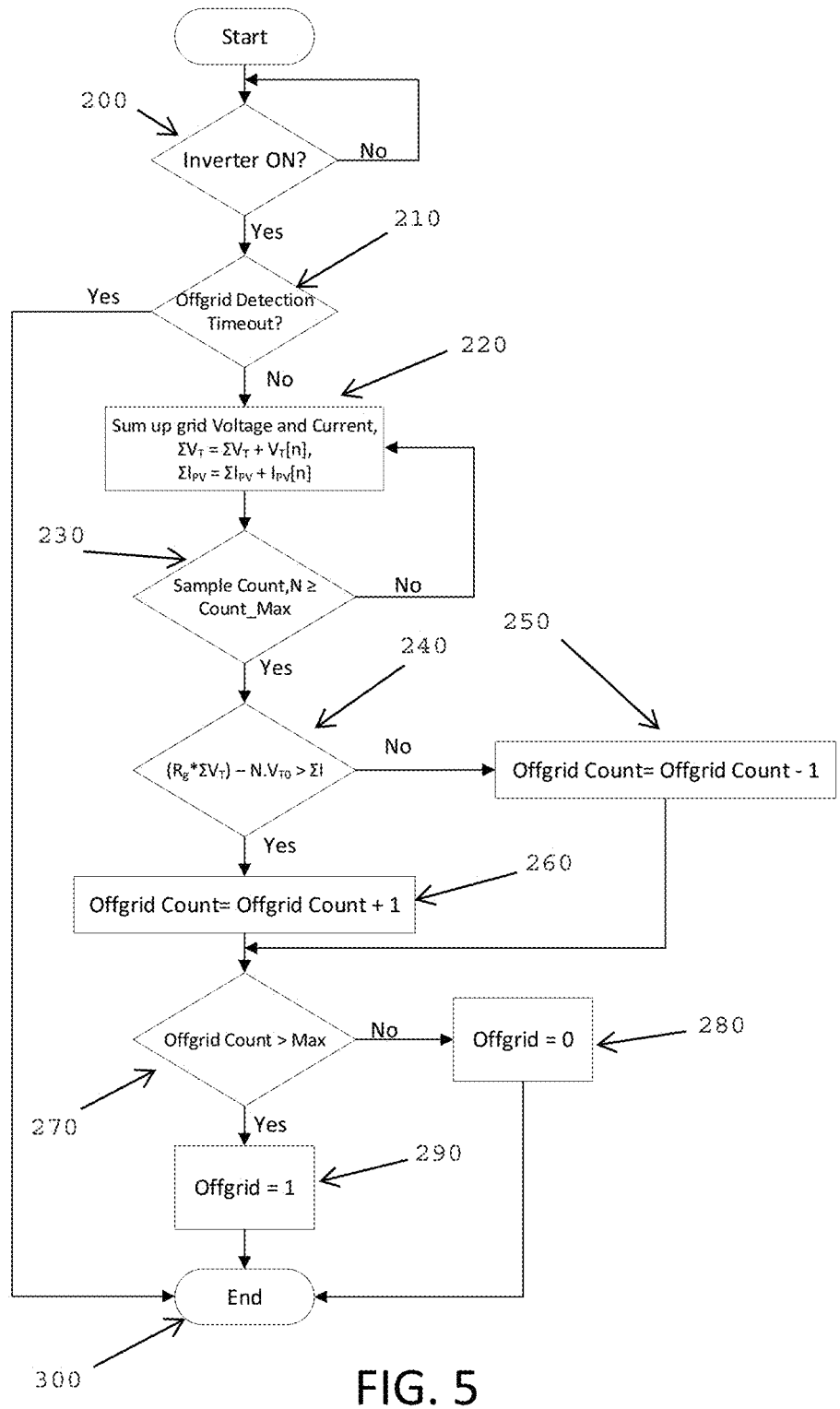
FIG. 5 is a flowchart detailing the steps in a method for detecting a suitable mode of operation for the power generation system according to one aspect of the present invention.

Referring to FIG. 5, a flowchart for a method for determining on-grid/off-grid mode detection is provided. The mode of operation (i.e. on-grid or off-grid) is determined based on the change in the load voltage amplitude.

The method illustrated in FIG. 5 begins at step 200, that of determining if the DC/AC microinverter is on. If the microinverter is not on, then the process keeps looping to step 200. Once the microinverter has been detected as being in operation, step 210 is that of determining if the off-grid detection process has timed out. This means that the time frame for determining if the power generation system is on-grid or off-grid has expired. If this time frame has expired, then the process ends. If, however, the time frame has not yet expired, then step 220 is that of performing a summing function to sum up the voltage and current readings from the terminals of the PV microinverter. Step 230 then determines if a sufficient number of samples have been taken/read. If an insufficient number of samples have been taken, then the process continuously loops back to step 220 to gather (and sum) more voltage and current readings from the microinverter's terminals.

Once a sufficient amount of readings have been taken and summed, the process continues to step 240, that of determining if mode of operation data meets a threshold or not. If the threshold is not met (i.e., the condition checked by step 240 is FALSE), then step 250 decrements a counter that counts how many instances of an off-grid condition has occurred and the process jumps to step 270. On the other hand, if the condition checked by step 240 is TRUE, then step 260 increments the counter that counts the occurrences of off-grid condition happening. Step 270 then checks to see if the number of off-grid occurrences has exceeded a given maximum. In the event that step 270 determines that the maximum number of off-grid occurrences has not been met, then the process determines that the power generation system is in the on grid operating mode (step 280) and the process ends. Conversely, if step 270 determines that the maximum number of off-grid occurrences has been exceeded, then the power generation system is in the off-grid operating mode (step 290) and the process ends.

As can be seen from the flowchart, the mode of operation (i.e. on-grid or off-grid) is determined based on the change in the load voltage amplitude.

The off-grid operating mode is detected based on the process depicted in the FIG. 5. To understand the process, the battery backup inverter can be considered as a 'weak-grid', since it does not have a tight control over the PCC voltage, which is mainly dependent on the battery terminal voltage and load connected at the terminals of the battery inverter. As the load increases, the voltage at the battery inverter terminals drops due to its internal resistance. Similarly, when the PV microinverter turns on, the effective load seen by the battery inverter starts decreasing and the terminal voltage starts to increase. Specifically, when the PV microinverter turns on with the same characteristics (i.e. with the same frequency, phase angle, and voltage magnitude) with the battery inverter, a steep rise in the PCC terminal voltage is detected. In the on-grid operating mode, such a rise in the voltage cannot occur as the grid ensures control over that voltage. Thus, monitoring the rise in voltage with a rising current output from the PV microinverter is an indication that the PV microinverter is operating with the same characteristics as the battery backup inverter and not with the AC power grid.

It should be clear that such a rise in voltage is monitored with a rise in current from the PV microinverter using a method of linear regression or curve fitting. The PCC terminal voltage in the two cases is given by (in the two possible cases):

$$= V_{Grid}, \text{On-Grid Mode} \quad (1)$$

$$= V_{T0} = V_{backup} - I_{b1} \cdot R_{int}, \text{Off-Grid Mode} \quad (2)$$

In these equations, $I_{b1}$ is the current supplied by the backup battery inverter to the loads, $R_{int}$ is the internal resistance of the backup battery inverter and $V_{T0}$ is the terminal voltage when PV microinverter is not turned on. When the PV microinverter starts supplying power, the terminal voltage changes to, $$V_T = V_{backup} + I_{b2} \cdot R_{int} \quad (3)$$

$$I_{b2} = I_{PV} - I_{b1} \quad (4)$$

For Equations (3) and (4), $I_{b2}$ is the portion of PV microinverter current that is going into the backup battery inverter for charging the batteries and $I_{PV}$ is the current supplied by the PV microinverter to the load. Hence, the change in PCC terminal voltage with turning on the PV microinverter is given by:

$$\Delta V_T = I_{PV} \cdot R_{int} \quad (5)$$

In order to identify the relationship given by Equation (5), the following method of regression is implemented, $$\frac{\left(\sum_{i=1}^{n} V_T\right) - n \cdot V_{T0}}{R_{int}} = \sum_{i=1}^{n} I_{PV} \quad (6)$$

In Equation (6), n is the number of samples used for identifying the mode of operation, $V_T$ is the voltage measured at the PCC terminal, $V_{T0}$ is the PCC terminal voltage before turning the PV microinverter on, $I_{PV}$ is the current supplied by the PV microinverter. The above equation can further be converted into a comparison for differentiating between the on-grid operating mode and the off-grid operating mode.

$$\frac{\left(\sum_{i=1}^{n} V_T\right) - n \cdot V_{T0}}{R_g} > \sum_{i=1}^{n} I_{PV} \quad (7)$$

In Equation (7), $R_g$ is the typical resistance between the grid and the PV microinverter. If the above described condition is true then it shows that the voltage has changed significantly by injecting some power (i.e. off-grid operating mode), whereas if this condition comes out to be false, it would show that the current injected to the system cannot change the PCC terminal voltage. This would mean that the power generation system is in an on-grid operating mode.

In order to allow a PV microinverter to deliver power to the local loads in an off-grid operating mode, the PV microinverter needs to identify the presence of a battery backup inverter and to differentiate that backup battery inverter from the power grid. In the off-grid operating mode, the PV microinverters need to be able to deliver the power that is just sufficient to support the load or loads. The power delivered to the loads is balanced by using the power droop characteristics as explained below.

Figure 6:
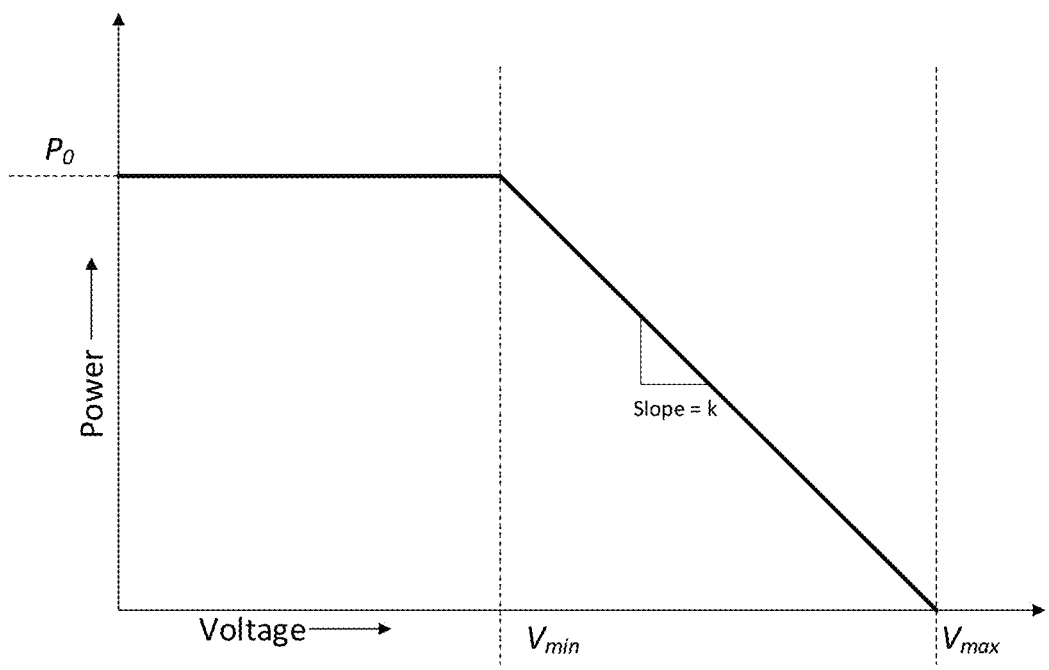
FIG. 6 is a plot detailing power extraction from a PV panel as a function of AC voltage at PCC in the off-grid operating mode

The power droop characteristics are implemented on the basis of the grid voltage magnitude as shown in FIG. 6 and is given by:

$$P = P_0 - k \cdot (V_{Grid} - V_{min}) \quad (8)$$

$$V_{min} \leq V_{Grid} \leq V_{max} \quad (9)$$

In Equations (8) and (9), P is the power delivered by the DC/DC converter at the grid voltage $V_{Grid}$, $P_0$ is the power delivered by the DC/DC converter at a voltage lower than $V_{min}$, the starting voltage of the droop characteristics. In PV microinverters, this power, $P_0$, corresponds to the Maximum Power Point (MPP). The slope of the droop characteristics is given by the constant k. This slope determines the maximum grid voltage at which the power output of the DC/DC converter is non-zero. The droop characteristics take effect only in the voltage range given by Equation (9).

The above characteristics are used by monitoring the difference between the instantaneous voltage magnitude of the grid and the minimum grid voltage, $V_{min}$. The value of $P_0$ is continuously updated if $V_{Grid} \leq V_{min}$. If the above difference is greater than zero (i.e. $V_{Grid} \geq V_{min}$), then the output power to be delivered is calculated from Equation (8) and the pre-programmed value of the droop constant k. A flowchart for the power-volt droop control method is shown in FIG. 7.

Figure 7:
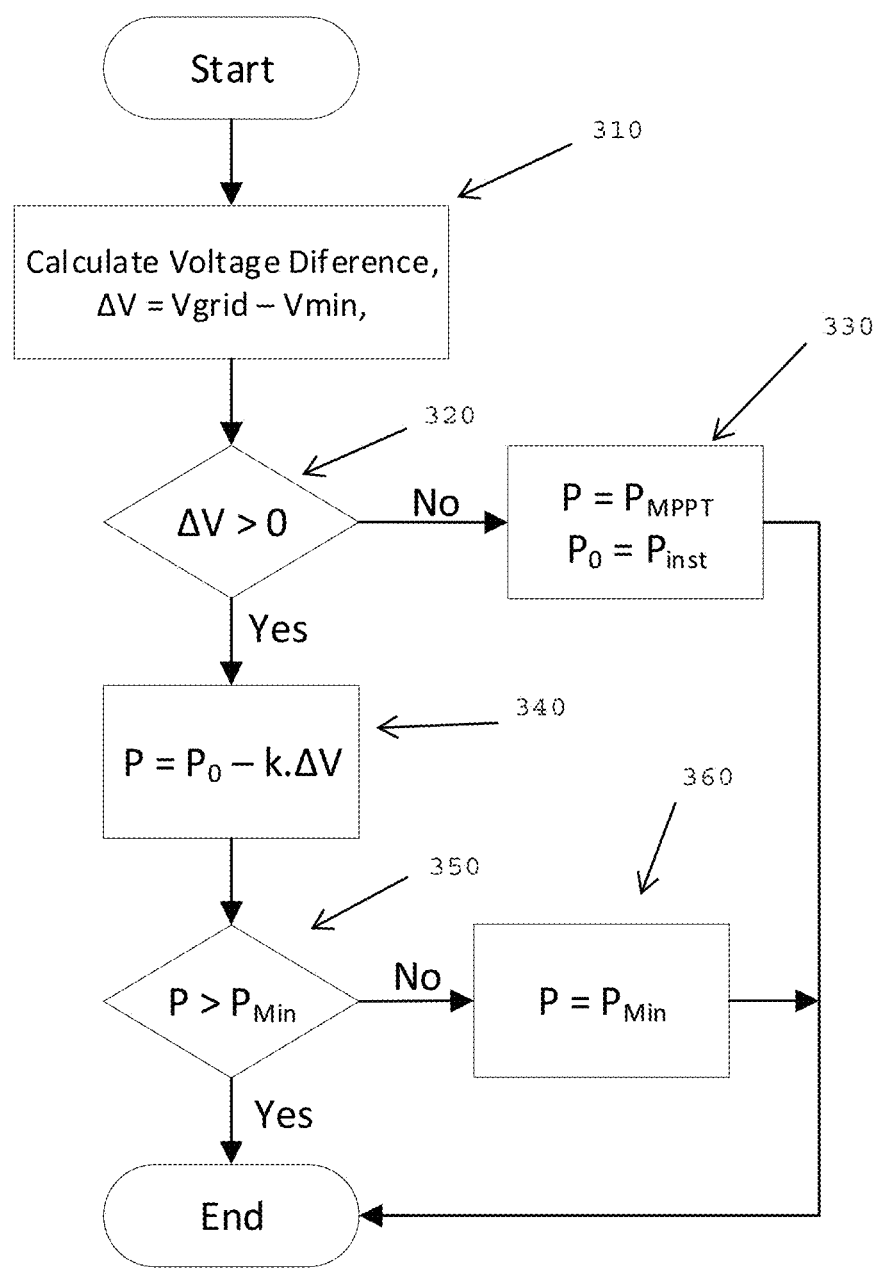
FIG. 7 shows a flowchart detailing the steps in a method for a power-volt droop control.

In FIG. 7, the process begins at step 310, that of calculating the voltage difference between the grid voltage and the minimum grid voltage. Step 320 then checks if the voltage difference is greater than zero. If the voltage difference is not greater than zero, then the power delivered by the DC/DC converter at the grid voltage is set to the MPP. Similarly, the power delivered by the DC/DC converter at a lower voltage than the minimum grid voltage, is set to be the instantaneous power (step 330). On the other hand, if the difference in voltage is greater than zero, then the power delivered by the DC/DC converter is calculated based on the difference in voltage and the power delivered at the lower voltage (step 340). Step 350 then checks if the power delivered by the DC/DC converter at the grid voltage is greater than the minimum power. If not, then the power delivered is set to be the same as the minimum power. If the power delivered is greater than the minimum power, then the process ends. It should be clear that the term $P_{min}$ in the Figure represents the minimum power (or lower limit) delivering capability of the PV-inverter.

The control circuitry for the power management system is self-regulating in that it self-tunes the threshold voltage. The threshold voltage is the maximum terminal voltage of the PV microinverter below which maximum power available to the PV panels can be delivered to the load. If the terminal voltage rises higher than the threshold voltage, the power-droop method is activated to cut down the power exported by a PV microinverter.

In order to determine and tune the threshold voltage based on the battery backup inverter, the maximum power available from the PV panels is fed to the load. This causes the terminal voltage to reach the voltage trip limit of the battery inverter. Once the battery inverter trips, the trip voltage is recorded, and the threshold voltage is set at a level slightly lower than the trip voltage level. In the next consecutive start-up, during the off-grid mode, the PV microinverter will cut down the power beyond the threshold voltage. If the power delivered by the PV microinverter is still higher than what is required by the load, the terminal voltage will again increase and trip the battery inverter. In the next consecutive start-up, during the off-grid mode, the PV microinverter will once again cut down the power to establish a new threshold value. The self-tuning method as described here is illustrated in a flowchart as shown in FIG. 8.

Figure 8:
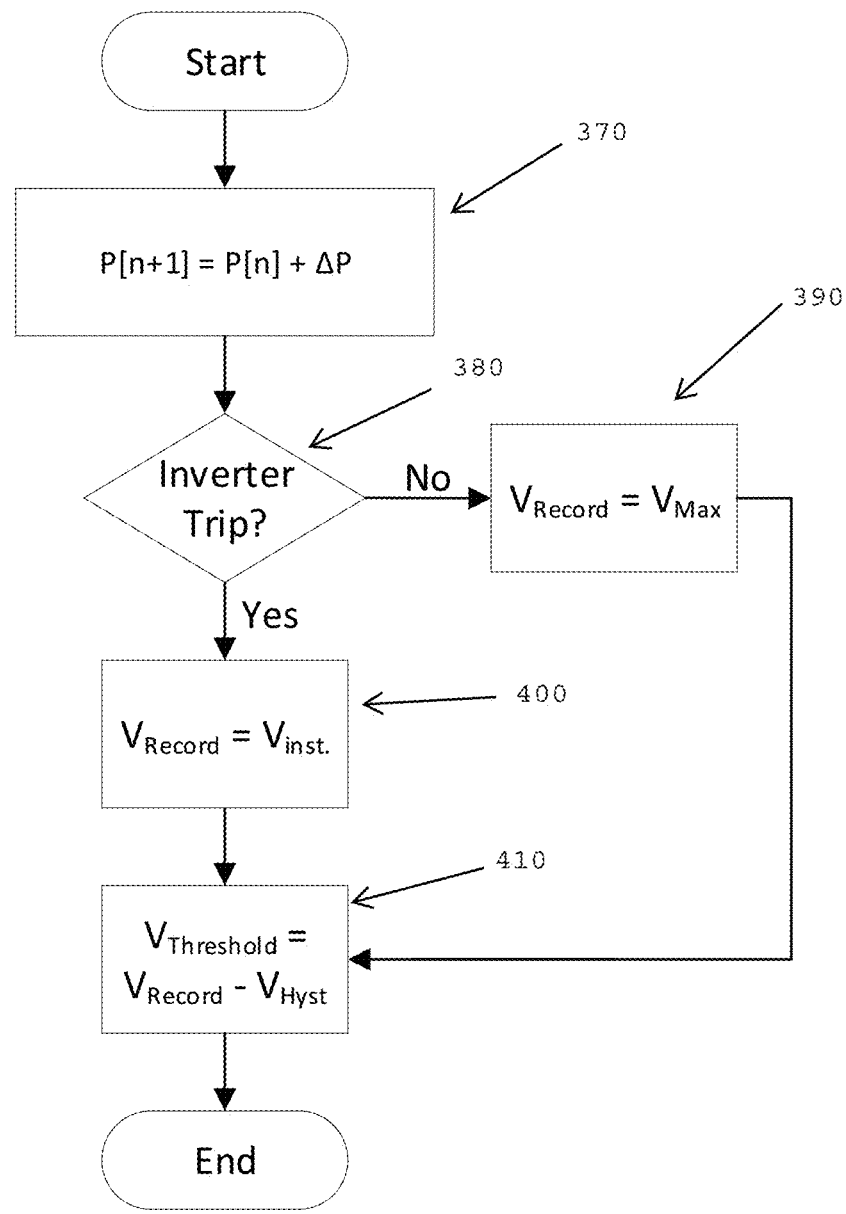
FIG. 8 shows a flowchart for a method for self-tuning the threshold voltage.

In FIG. 8, the process begins at step 370, that of adding a previous power reading to the difference in power to arrive at the current power reading. Step 380 then checks if the battery inverter has tripped. If the battery inverter has not tripped, then the maximum voltage is recorded as the recorded voltage and the process moves to step 410 and the new threshold voltage is calculated. Conversely, if the battery inverter has tripped, then the recorded voltage is recorded as the instantaneous voltage (step 400). In step 410 the threshold voltage is set to be the sum of the recorded voltage and the hysteresis voltage ($V_{HYST}$) The process then ends. It should be clear that the term $V_{HYST}$ in the Figure refers to the small negative change in voltage from the recorded value and that this term determines the new threshold voltage.

When the PV microinverter detects the off-grid mode, the threshold voltage is initially set to the maximum operating voltage of the PV inverter. Due to the maximum threshold voltage, the PV inverter starts to export power with an initial power ramp up, until the PV inverter reaches maximum power under the threshold voltage. Two separate conditions can appear during this kind of power ramp up. The PV microinverter can achieve stable operation, or it trips at some voltage which is not supported by the battery inverter. If the battery inverter trips, the threshold voltage self-tuning is performed to determine a stable operating threshold voltage. Once the threshold voltage is determined, the PV microinverter starts with a power ramp-up routine. As load terminal voltage reaches the threshold voltage, the power-voltage droop characteristics method above starts curtailing the power injected by the PV inverter.

Figure 9:
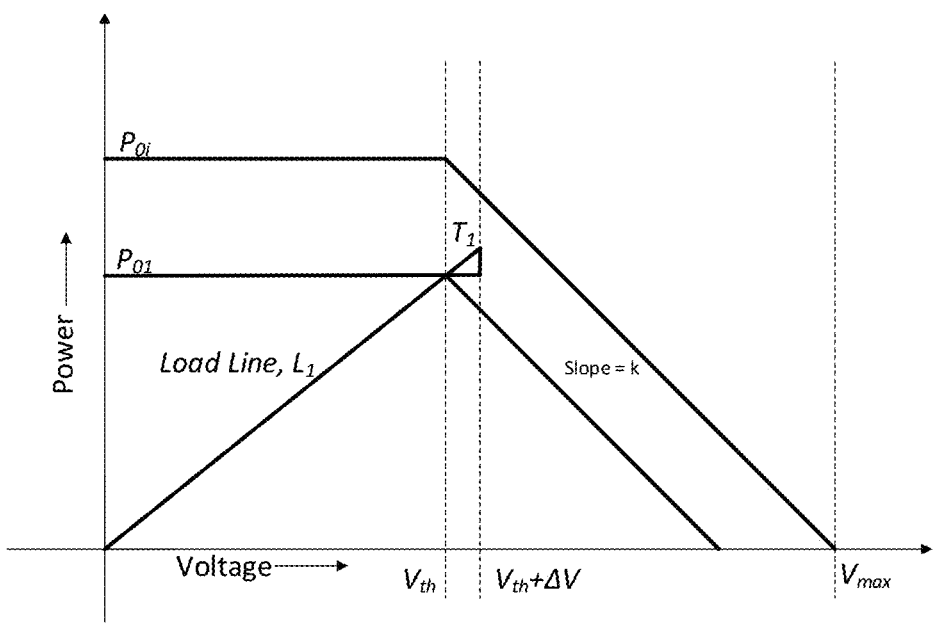
FIG. 9 shows a plot of the P-V plane droop characteristics and which explains the load-source power balance at the threshold voltage.

The change in the AC terminal voltage to the available PV power is near instantaneous. However, any leveled change in the extraction of PV power, for a given change in the AC terminal voltage, is governed by the time response characteristics of the power-voltage droop curve. As an example, in FIG. 9 it is assumed that a load L1 is connected to the system. With a change in the power delivered to the load, the PCC terminal voltage of the system changes according to the load line associated with load L1. As the power is increased, the system voltage also increases. At a power level $P_{O1}$, the AC terminal voltage crosses the threshold voltage, $V_{th}$ of the PV microinverter. At this time the new power level $P_{O1}$ is recorded and treated as the peak power that the load can accept at threshold voltage. Since the PV microinverter cannot reduce power until it measures a voltage greater than the threshold voltage, it keeps increasing power and reaches a voltage $V_{th}+\Delta V$, which is measured by the PV microinverter. A new reference power is calculated by the PV microinverter (lower than the power level $P_{O1}$) and the microinverter starts reducing the output power to reach a new reference value. While the power is lowered, the terminal voltage again changes from $V_{th}+\Delta V$ to just $V_{th}$. Once the microinverter reaches the threshold voltage, it again starts increasing power. Thus, the microinverter starts regulating the PCC terminal voltage at the threshold voltage level, within the small triangular region $T_1$ on the Power-Voltage plane.

Figure 10:
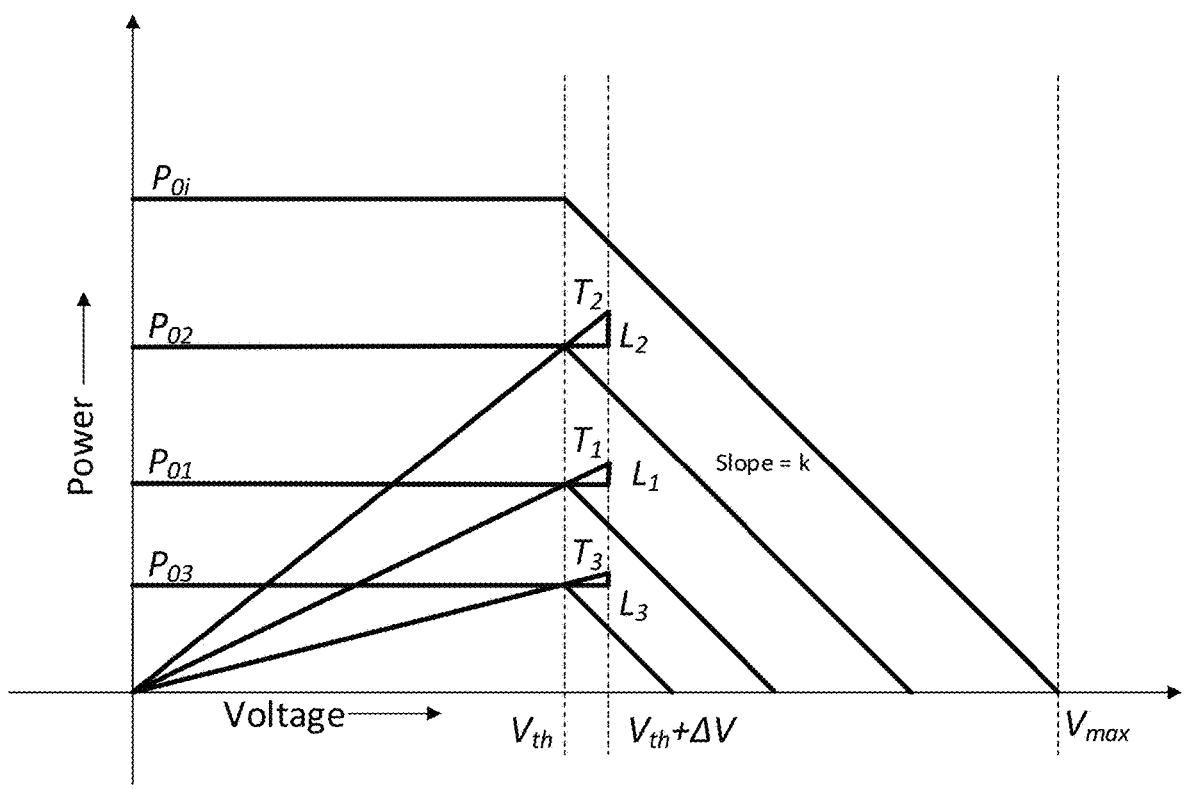
FIG. 10 shows a plot of the P-V plane droop characteristics and explains the load-source power balance at the threshold voltage with a change in the load power.

If the load changes from a value $L_1$ to a new value $L_2$, (where $L_2>L_1$) then the load line on the P-V plane shifts to a new position with a greater slope, shown in FIG. 10. The increase in load to the system causes the terminal voltage to drop (lower than the threshold voltage) according to the new load line. Since the terminal voltage decreases below the threshold voltage, the PV microinverter starts injecting more power to boost the voltage back to the threshold voltage. At this point the inverter, again, stabilizes operation in the new triangular region $T_2$.

Similarly, if a load reduction happens (a change in load from $L_1$ to $L_3$ where $L_3<L_1$), the terminal voltage increases according to the new load line. In this case, two different scenarios can arise. In the first scenario, the increase in voltage is small such that the battery inverter does not trip. In this scenario, the PV microinverter starts reducing power to reach the threshold voltage and stabilizes in the new triangular region $T_3$. In the second scenario, the load reduction is high enough that the battery inverter trips momentarily and recovers. In this second scenario, the self-tuning block records a new threshold voltage and starts delivering power again while regulating the terminal voltage at the new threshold voltage.

The above description explains that the voltage self-tuning and power droop characteristics allow the PV microinverter to be independent and allows multiple microinverters to determine the same threshold voltage and share the power delivered to the load.

For clarity, the control circuitry that determines the operating mode for the power generation system can include a suitable data processing module to perform the calculations and to execute the methods detailed in the enclosed flowcharts. This data processing module may be implemented as a dedicated ASIC (application specific integrated circuit) or as a general purpose data processor (e.g. a microcontroller).

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for managing an operation of a power inverter for use with a power generation subsystem, the system comprising
   a data sensing module for receiving power related data from circuitry monitored by said system;
   a data processing module for calculating mode of operation data based on said power related data received by said data sensing module, said mode of operation data being used to determine a mode of operation for said power inverter;
   a controller module for controlling said power inverter based on said mode of operation determined by said data processing module;
   wherein said power generation subsystem is switchable to provide power to at least one of: a power grid and at least one load;

said system determines if power generated by said power generation subsystem is for provision to said power grid or to said at least one load;

said data sensing module receives power related data from at least one battery inverter, said battery inverter being coupled to a battery with said battery being switchable to provide power to said at least one load;

said system operates said power generation subsystem differently when said power generation subsystem is coupled to said power grid than when said power generation subsystem is not coupled to said power grid;

said mode of operation data is based on an amount of voltage sensed at a point of common coupling between said power grid, said battery inverter, and said power inverter irrespective of a state of operation of said power grid.

2. The system according to claim 1, wherein said power generation subsystem comprises at least one photovoltaic (PV) panel.

3. The system according to claim 1, wherein said power generation subsystem comprises at least one wind turbine.

4. The system according to claim 1, wherein the power generation subsystem comprises at least one source of renewable energy.

5. The system according to claim 1, wherein when said mode of operation data is lower than a predetermined threshold, said power inverter is operated in an off grid mode such that said power inverter provides power to said at least one load.

6. The system according to claim 1, wherein when said mode of operation data is higher than a predetermined threshold, said power inverter is operated in an on grid mode such that said power inverter provides power to said power grid.

7. The system according to claim 6, wherein when said power inverter is operated in said on grid mode, a maximum power from said inverter is provided to said grid.

8. The system according to claim 5, wherein when said power inverter is operated in said off grid mode, a less than maximum power from said inverter is provided to said load, said less than maximum power being based on a threshold voltage.

9. The system according to claim 8, wherein said threshold voltage is automatically adjusted by said system.

10. A method for determining a mode of operation of a power generation system that is coupled to a power grid irrespective of a state of operation of said power grid, the method comprising:

a) determining a voltage at a point of common coupling, said point of common coupling being a coupling point to which said power grid and said power generation system and at least one load is coupled;

b) determining a rise in said voltage determined in step a);

c) determining a rise in current output from an inverter of said power generation system;

d) determining if a specific condition is true, said specific condition being $$\frac{\left(\sum_{i=1}^{n} V_T\right) - n \cdot V_{T0}}{R_g} > \sum_{i=1}^{n} I_{PV}$$

e) determining that said power generation system is operating in an on-grid operating mode if said specific condition is false;

f) determining that said power generation is operating in an off-grid operating mode if said specific condition is true;

wherein $R_g$ is a typical resistance between the grid and said inverter;

$V_{T0}$ is a terminal voltage when said inverter is not turned on;

$V_T$ is a voltage measured at said terminals of the battery inverter;

$I_{PV}$ is a current supplied by said inverter to said load; and wherein steps a)-c) are repeated for multiple readings of said currents and voltages.

11. The method according to claim 10, wherein said method is executed by system comprising:

a data sensing module for receiving power related data from circuitry monitored by said system;

a data processing module for calculating mode of operation data based on said power related data received by said data sensing module, said mode of operation data being used to determine a mode of operation for said power inverter;

a controller module for controlling said power inverter based on said mode of operation determined by said data processing module;

wherein said power generation system is switchable to provide power to at least one of:

said power grid and said at least one load;

said data sensing module receives power related data from at least one battery inverter, said battery inverter being coupled to a battery with said battery being switchable to provide power to said at least one load; and said system operates said power generation system differently when said power generation system is coupled to said power grid than when said power generation system is not coupled to said power grid.

12. The method according to claim 10, wherein said power generation system comprises at least one photovoltaic (PV) panel.

13. The method according to claim 10, wherein said power generation system comprises at least one wind turbine.

14. The method according to claim 10, wherein the power generation system comprises at least one source of renewable energy.

15. A system for managing an operation of a power inverter for use with a power generation subsystem, the system comprising:

a data sensing module for receiving power related data from circuitry monitored by said system;

a data processing module for calculating mode of operation data based on said power related data received by said data sensing module, said mode of operation data being used to determine a mode of operation for said power inverter;

a controller module for controlling said power inverter based on said mode of operation determined by said data processing module;

wherein said mode of operation data is based on an amount of voltage sensed at a point of common coupling between said power grid, said battery inverter, and said power inverter irrespective of a state of operation of said power grid.

\* \* \* \* \*